United States Patent
Sanders et al.

(10) Patent No.: US 10,346,151 B2
(45) Date of Patent: Jul. 9, 2019

(54) CLOUD COMPUTING RESOURCE ORCHESTRATION

(71) Applicant: CloudBolt Software Inc., Rockville, MD (US)

(72) Inventors: Bernard Sanders, Portland, OR (US); Alexandre Augusto Ramos da Rocha, Rockville, MD (US); Lisa Percival, Portland, OR (US)

(73) Assignee: CLOUDBOLT SOFTWARE INC., Rockville, MD (US)

( * ) Notice: Subject to any disclaimer, the term of this patent is extended or adjusted under 35 U.S.C. 154(b) by 108 days.

(21) Appl. No.: 15/253,075

(22) Filed: Aug. 31, 2016

(65) Prior Publication Data

US 2018/0013637 A1     Jan. 11, 2018

Related U.S. Application Data (60) Provisional application No. 62/359,019, filed on Jul. 6, 2016.

(51) Int. Cl.

| | |
|---|---|
| *H04L 12/24* | (2006.01) |
| *H04L 12/911* | (2013.01) |
| *G06F 9/445* | (2018.01) |
| *G06F 8/65* | (2018.01) |
| *G06F 8/60* | (2018.01) |
| *G06F 9/455* | (2018.01) |

(52) U.S. Cl.
CPC .............. *G06F 8/65* (2013.01); *G06F 8/60* (2013.01); *G06F 9/44526* (2013.01); *G06F 9/45512* (2013.01); *G06F 9/45558* (2013.01)

(58) Field of Classification Search
CPC ......... H04L 67/10; H04L 69/40; H04L 47/70; G06F 15/16; G06F 11/0709; G06F 9/54; G06F 9/541
USPC .......................................... 709/226; 715/202
See application file for complete search history.

(56) References Cited

U.S. PATENT DOCUMENTS

| | | | |
|---|---|---|---|
| 8,495,356 B2 | 7/2013 | Ashok et al. | |
| 9,645,811 B2 * | 5/2017 | Carlen | H04L 65/80 |
| 9,804,901 B2 * | 10/2017 | Gambardella | H04L 65/80 |
| 9,897,449 B2 * | 2/2018 | Azami | G01C 21/12 |
| 2010/0235526 A1 | 9/2010 | Carter et al. | |
| 2010/0235903 A1 | 9/2010 | Carter et al. | |

(Continued)

FOREIGN PATENT DOCUMENTS

CN     102185927 A     9/2011

OTHER PUBLICATIONS

Badger, et al., "Cloud Computing Synopsis and Recommendations", NIST—National Institute of Standards and Technology, May 2012, p. 81.

(Continued)

*Primary Examiner* — Tesfay Yohannes
(74) *Attorney, Agent, or Firm* — Morris & Kamlay LLP (57) ABSTRACT

Provided are example methods and apparatus for orchestrating cloud computing resources which enable customizing cloud management software to add, via user-provided code, features and functionality which go beyond base features built into the cloud management software, without otherwise modifying the cloud computing management software. The user-provided code can include a plug-in, a script, a webhook, a callout, the like, or a combination thereof.

12 Claims, 3 Drawing Sheets

(56) References Cited

U.S. PATENT DOCUMENTS

| | | | |
|---|---|---|---|
| 2011/0010339 A1 | 1/2011 | Wipfel et al. | |
| 2011/0302415 A1* | 12/2011 | Ahmad | G06F 21/57 |
| | | | 713/168 |
| 2012/0173731 A1 | 7/2012 | Lin et al. | |
| 2012/0239825 A1 | 9/2012 | Xia et al. | |
| 2012/0259771 A1* | 10/2012 | Hwang | G06Q 20/3224 |
| | | | 705/39 |
| 2012/0260228 A1 | 10/2012 | Mallick et al. | |
| 2012/0278861 A1 | 11/2012 | Lu et al. | |
| 2014/0115161 A1 | 4/2014 | Agarwal et al. | |
| 2014/0298091 A1* | 10/2014 | Carlen | H04L 65/80 |
| | | | 714/15 |
| 2015/0019301 A1* | 1/2015 | Jung | G06Q 10/06393 |
| | | | 705/7.39 |
| 2015/0178287 A1* | 6/2015 | Kim | G06F 16/4393 |
| | | | 715/202 |
| 2015/0277856 A1* | 10/2015 | Payne | G06F 7/588 |
| | | | 708/255 |
| 2015/0302734 A1* | 10/2015 | Geerlings | G08C 19/28 |
| | | | 340/5.25 |

OTHER PUBLICATIONS

Cloudbolt Software, "Actions", http://docs.cloudbolt.io/advanced/orchestration-actions/actions.html#action-input-parameters, 2015, p. 1.

Cloudbolt Software, "Continuous Infrastructure Testing", http://docs.cloudbolt.io/advanced/continuous-infrastructure-testing/index.html, 2015, p. 1.

Cloudbolt Software, "Orchestration", http://docs.cloudbolt.io/advanced/orchestration-actions/index.html, 2015, p. 1.

Cloudbolt Software, "Order Form Customization", http://docs.cloudbolt.io/order-form-customization.html, 2015, p. 1.

Cloudbolt Software, "Service Catalog Overview/Capabilities", http://docs.cloudbolt.io/service-catalog/index.html, 2015, p. 1.

* cited by examiner

CLOUD COMPUTING RESOURCE ORCHESTRATION

CLAIM OF PRIORITY

The present application for patent claims priority to United States Provisional Patent Application No. 62/359,019 entitled "CLOUD COMPUTING RESOURCE ORCHESTRATION", filed Jul. 6, 2016, and assigned to the assignee hereof and hereby expressly incorporated by reference herein.

FIELD OF DISCLOSURE

This disclosure relates generally to electronics, and more specifically, but not exclusively, to methods and apparatus which relate to cloud computing.

BACKGROUND

Significant customization of servers is required when customers deploy the servers across multiple and at least partially incompatible computing clouds. The significant customization is required to implement a specific workload or application which a server is deployed to perform. Customizing the server during deployment is conventionally difficult in both public and private clouds.

With conventional techniques, even if a target cloud upon which the server is deployed allows customization, the resultant functionality of equipment in the target cloud is limited. Thus, deploying customized servers across multiple and at least partially incompatible clouds which is problematic, because the equipment which must be customized does not work across the multiple and at least partially incompatible clouds. This makes standardizing deployments difficult and time consuming for customers who are deploying workloads across the multiple incompatible clouds.

SUMMARY

This summary provides a basic understanding of some aspects of the present teachings. This summary is not exhaustive in detail, and is neither intended to identify all critical features, nor intended to limit the scope of the claims.

Example methods and apparatus for orchestrating cloud computing resources are disclosed. An example method includes receiving, at a computing device, user-provided code. The user-provided code is configured to add one or more computing resource management functions to cloud computing management software, without otherwise modifying the cloud computing management software. The user-provided code can be a plug-in, a script, a webhook, a callout, or a combination thereof. The example method also includes storing the user-provided code in an electronic memory device. The example method can further include executing the user-provided code in response to: receiving, from a graphical user interface, an instruction to execute the user-provided code; commencing execution of a service order; transmitting a configuration parameter of a computing resource; receiving, via the graphical user interface, a user-provided approval of the service order; completing the service order; receiving a change to the configuration parameter; receiving an indication that a user has logged-in; or a combination thereof. In an example, the method can further include executing the user-provided code and receiving, from a graphical user interface of the cloud computing management software, input indicating a configuration parameter of a computing resource. The user-provided code is configured to manage the computing resource. In an example, the method can further include executing the user-provided code and calling an application program interface in response to a command from the user-provided code.

In a further example, provided is a non-transitory computer-readable medium, comprising processor-executable instructions stored thereon. In an example, the processor-executable instructions can be configured to cause a processor to execute one or more parts of a method described herein. In another example, the processor-executable instructions can be configured to cause a processor to initiate executing one or more parts of a method described herein.

In another example, provided is a first apparatus. The first apparatus includes means for executing one or more parts of a method described herein. For example, the first apparatus can include means for receiving, at a computing device, user-provided code, as well as means for storing the user-provided code in an electronic memory device. The user-provided code is configured to add one or more computing resource management functions to cloud computing management software, without otherwise modifying the cloud computing management software. The user-provided code can be a plug-in, a script, a webhook, a callout, or a combination thereof. The first apparatus can include means for executing the user-provided code in response to: receiving, from a graphical user interface, an instruction to execute the user-provided code; commencing execution of a service order; transmitting a configuration parameter of a computing resource; receiving, via the graphical user interface, a user-provided approval of the service order; completing the service order; receiving a change to the configuration parameter; receiving an indication that a user has logged-in; or a combination thereof. In an example, the first apparatus can further include means for executing the user-provided code and means for receiving, from a graphical user interface of the cloud computing management software, input indicating a configuration parameter of a computing resource. The user-provided code is configured to manage the computing resource. In another example, the first apparatus can further include means for executing the user-provided code and means for calling an application program interface in response to a command from the user-provided code.

In another example, provided is a second apparatus. The second apparatus includes a processor and a memory coupled to the processor. The memory is configured to cause the processor to initiate creating specific logic circuits within the processor. The specific logic circuits are configured to cause the processor to initiate executing one or more parts of a method described herein. For example, the specific logic circuits are configured to cause the processor to initiate receiving user-provided code and storing the user-provided code in the memory. The user-provided code is configured to add one or more computing resource management functions to cloud computing management software, without otherwise modifying the cloud computing management software. The user-provided code can be a plug-in, a script, a webhook, a callout, or a combination thereof. In an example, the memory can be configured to cause the processor to initiate creating specific logic circuits configured to cause the processor to initiate executing the user-provided code in response to: receiving, from a graphical user interface, an instruction to execute the user-provided code; commencing execution of a service order; transmitting a configuration parameter of a computing resource; receiving, via the graphical user interface, a user-provided approval of the service order; completing the service order; receiving a change to the configuration parameter; receiving an indication that a user has logged-in; or a combination thereof. The memory can further be configured to cause the processor to initiate creating specific logic circuits configured to cause the processor to initiate executing the user-provided code and to initiate receiving, from a graphical user interface of the cloud computing management software, input indicating a configuration parameter of a computing resource, where the user-provided code is configured to manage the computing resource. In an example, the memory can be configured to cause the processor to initiate creating specific logic circuits configured to cause the processor to initiate executing the user-provided code and to initiate calling an application program interface in response to a command from the user-provided code.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings are presented to describe examples of the present teachings, and are not limiting.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Methods and apparatuses which orchestrate cloud computing resources are provided. Example methods and apparatus customize cloud management software, and can do so automatically. The example methods and apparatus enable customers to add features and functionality in addition to base features built into the cloud management software. Since each customer has unique requirements, the example methods and apparatus enable customers to expand the functionality of the cloud management software. The example methods and apparatus make it easy to extend the features and functionality of the target cloud for deployments, as well as make it easy to extend the features and functionality of the cloud management software.

Example methods and apparatus enable customers to create customized software and/or scripts which can be run on: 1) a cloud server in a target cloud, 2) a cloud management server, or 3) both. The customized software and/or scripts which can be run at any time during provisioning of a cloud server or after the cloud server is provisioned. The example methods and apparatus enable customization and extension of back-end processes such as server provisioning, lifecycle management, user authentication, order approval flows, the like, or a combination thereof. The example methods and apparatus work independently from the target cloud on which a given workload is being deployed.

In an example, cloud orchestration techniques can provision a server and run configuration software to customize the server, where the server is in a virtual network spanning two or more respectively independent clouds (i.e., pools of computing resources). The clouds can be at least partially incompatible.

The example methods and apparatus can be used to: create domain name server (DNS) records for servers before the servers are provisioned, automatically add a server to an external asset tracking system, enable monitoring of a new server, communicate with a storage array to allocate a new logical unit number (LUN) which identifies a logical unit (a device addressed by the SCSI protocol or Storage Area Network protocols which encapsulate SCSI, such as Fibre Channel or iSCSI) when requested by the user, send messages to chat systems when new services or servers are built, synchronize user-group membership with an active directory (AD) when a user logs in, check a server for a known security vulnerability and turn the server off automatically if a security vulnerability is discovered, customize a virtual network based on an application or a workload which is being deployed, the like, or a combination thereof.

Examples disclosed hereby advantageously and beneficially address long-felt industry needs, as well as other previously unidentified needs, and mitigate shortcomings of the conventional methods and conventional apparatus. Disclosed examples beneficially improve functioning of a computer (e.g., a platform management device), improve an existing technological process (e.g., configuring computing resources provided by one or more cloud computing platforms), or both. Among other advantages, provided examples can reduce complexity of selecting computing resources across different cloud computing platforms. Disclosed examples can also beneficially reduce the time required to select computing resources across different cloud computing platforms. Provided examples can beneficially reduce complexity of configuring computing resources across different cloud computing platforms. Disclosed examples can also advantageously reduce the time required to configure computing resources across different cloud computing platforms. Provided examples can beneficially reduce complexity of managing computing resources across different cloud computing platforms. Disclosed examples can also advantageously reduce the time required to manage computing resources across different cloud computing platforms.

Among other advantages, the examples can advantageously improve ease of customizing applications, improve ease of standardizing across disparate clouds, improve ease of integrating into customer backend systems, improve ability to push or pull code and/or information from disparate data sources, make standardizing across clouds easy, reduce deployment time for deploying workloads across multiple clouds, make it easy to run security compliance and auditing of a given infrastructure to ensure that a given server or servers are operating within policy parameters (which can be defined by each customer), save costs over conventional techniques, save significant time and resources which over manual actions, reduce errors causes by manual tasks, the like, or combinations thereof.

The provided example methods and apparatuses also improve, for example, the technical fields of computer management, computer resource management, and cloud computing.

Examples are disclosed in this application's text and drawings. Alternate examples can be devised without departing from the scope of the disclosure. Additionally, conventional elements of the current teachings may not be described in detail, or may be omitted, to avoid obscuring aspects of the current teachings.

The following list of abbreviations, acronyms, and terms is provided to assist in comprehending the current disclosure, and are not provided as limitations.

API—application programming interface
CMDB—configuration management database
IaaS—infrastructure as a service
PaaS—platform as a service
SaaS—software as a service Cloud computing is a model for enabling one or more cloud users (a "user") to access a shared pool of computing resources. The computing resources can include one or more processors, one or more servers (physical, virtual, or both), one or more storage devices (for example, memory, disk storage, the like, and combinations thereof), one or more network devices, one or more networks (for example, a virtual network, including internet protocol addresses), one or more firewalls, one or more load balancers, one or more virtual machines, one or more operating systems, one or more software applications, one or more programming languages, one or more computer-based services, one or more pods of containers, one or more web servers, the like, or a combination thereof. The computing resources can be offered with a service model which best suits a user's constraints (for example, skill level, needs, ability to pay, etc.). Cloud computing often has five characteristics: on-demand self-service by one or more users, broad network access, pooled computing resources, rapid elasticity, and measured service.

Users may not own the hardware constituting a cloud, the software run on the cloud's hardware, or both. Instead, a user can lease, from a cloud provider, at least some portion of the hardware, at least some portion of the software, or both.

Cloud computing advantageously provides an economy of scale unattainable with user-owned and maintained resources. A user need not purchase a complete set of hardware and software necessary to complete a particular task or provide a particular service. Instead, the user only pays for the user's use (that is, a utility computing basis) or the user pays a flat rate on a time-basis (for example, the user purchases use of an e-mail application for $12.00 per month). This can be analogized to the user renting the computing resources the user needs, for the duration the user needs the computing resources. Further, the cloud provider can spread demand from multiple users across one or more machines, which improves machine utilization in an economically efficient manner. Improved machine utilization reduces a number of idle machines, which saves power. Thus, computing resources are efficiently shared among many users, which results in the economy of scale, cost savings for users, profits for cloud providers, and power savings.

Cloud computing is also dynamically scalable (though not in an unlimited manner) to meet a user's timely needs (for example, pay-as-you-grow (or shrink)). A workload can be run on multiple machines (for example, physical, virtual, or both) to meet service demand. A workload can be a combination of one or more processing loads, one or more storage loads, the like, or a combination thereof. The user can thus save money which would otherwise be allocated to purchase a multitude of computing resources needed to ensure the user can meet the user's peak needs.

Cloud computing also advantageously enables the user to focus on the user's core tasks, and unburdens the user from having to purchase, configure, secure, and maintain computing resources. The user is further unburdened by not having to learn new computing skills needed to configure and maintain underlying computing resources. Many of the cloud's processes are transparent to the user. Software running on the cloud may appear, to a user, on the user's computer as if the software was installed and running locally on the user's computer. Cloud computing can present the user with a simple environment.

A cloud can be configured based on the following service models: infrastructure as a service (IaaS), platform as a service (PaaS), software as a service (SaaS), or a combination thereof. Each of these are described in turn. Other service models are possible; the discussion below is not meant to be limiting.

When offering IaaS, a cloud provider offers access to at least a portion of user-configurable individual components in a shared pool of computing resources. The computing resources can include one or more processors, one or more servers (physical, virtual, or both), one or more storage devices (for example, memory, disk storage, the like, and combinations thereof), one or more network devices, one or more networks (for example, including internet protocol addresses), one or more firewalls, one or more load balancers, the like, or a combination thereof.

A user of IaaS can optionally install one or more operating systems, applications, or both, of the user's choice on the user-configurable individual components. The user may be required to maintain the installed software. The user may also be required to configure each user-configurable individual component.

In IaaS, the components can be offered for use for a user-determined duration. The components can be offered on a fractional (that is, shared) access basis or an exclusive access basis. In an example, the user can be billed for specific component use or the user can be billed at a flat rate based on the components used. IaaS offers a highly-technical user a high level of implementation flexibility and a high level of configuration options.

When offering PaaS, the cloud provider offers a preconfigured arrangement of components and software, where the components and software are in a shared pool of computing resources. The computing resources can include one or more processors, one or more servers (physical, virtual, or both), one or more storage devices (for example, memory, disk storage, the like, and combinations thereof), one or more network devices, one or more networks (for example, including internet protocol addresses), one or more firewalls, one or more load balancers, the like, or a combination thereof. The preconfigured software can include one or more operating systems, one or more databases, one or more programming environments, one or more runtime environments, one or more web servers, the like, or a combination thereof.

In PaaS, the components and software can be offered for use for a user-determined duration. The components and software can be offered on a fractional (that is, shared) access basis or an exclusive access basis. In an example, the user can be billed for specific component and software use or the user can be billed at a flat rate based on the components used. PaaS advantageously offers a user, who has a specific need, a quick solution to the user's needs. However, PaaS does not require the user to purchase and manually configure the underlying resources. For example, a software developer can use a PaaS-based programming environment to develop a new program, without the software developer having to purchase a development server, an operating system for the development server, and programming language software. An environment can include a group of jointly acting computing resources.

When offering SaaS, the cloud provider offers pre-installed and cloud provider-maintained application software. The user does not maintain the underlying hardware, network, database, operating system, or application. In examples, the user can access the application software from many different locations, such as via the Internet.

In an example, the user can be billed for specific software use or the user can be billed at a flat rate based on the software used. SaaS advantageously offers a user, who has a specific software need, with a quick solution to the user's needs. However, SaaS does not require the user to purchase and manually configure the underlying resources or the software. For example, a businessperson can use a SaaS web-based email program, without the businessperson having to purchase, configure, and maintain a server, an operating system for the server, and email software.

Cloud computing has several different deployment models. For example, a private cloud deployment model can be provided for exclusive use by users in an organization. As a further, example, a community cloud deployment model can be provided for use by an exclusive community of users having a common need. Moreover, a public cloud deployment model can be provided for use by anyone. Further, any of these three deployment models can be combined and implemented with technology enabling portable data, one or more portable applications, or both.

Cloud computing requires hardware, such as one or more processors, one or more servers (physical, virtual, or both), one or more storage devices (for example, memory, disk storage, the like, and combinations thereof), one or more network devices, one or more networks, the like, or a combination thereof. Configuration of the hardware can be very flexible. A first hardware component in a first cloud can be configured to be coupled to a second hardware component located in the first cloud or located in a second cloud. The first hardware component in the first cloud can be configured to be coupled to a third hardware component located remotely from the first cloud.

Figure 1:
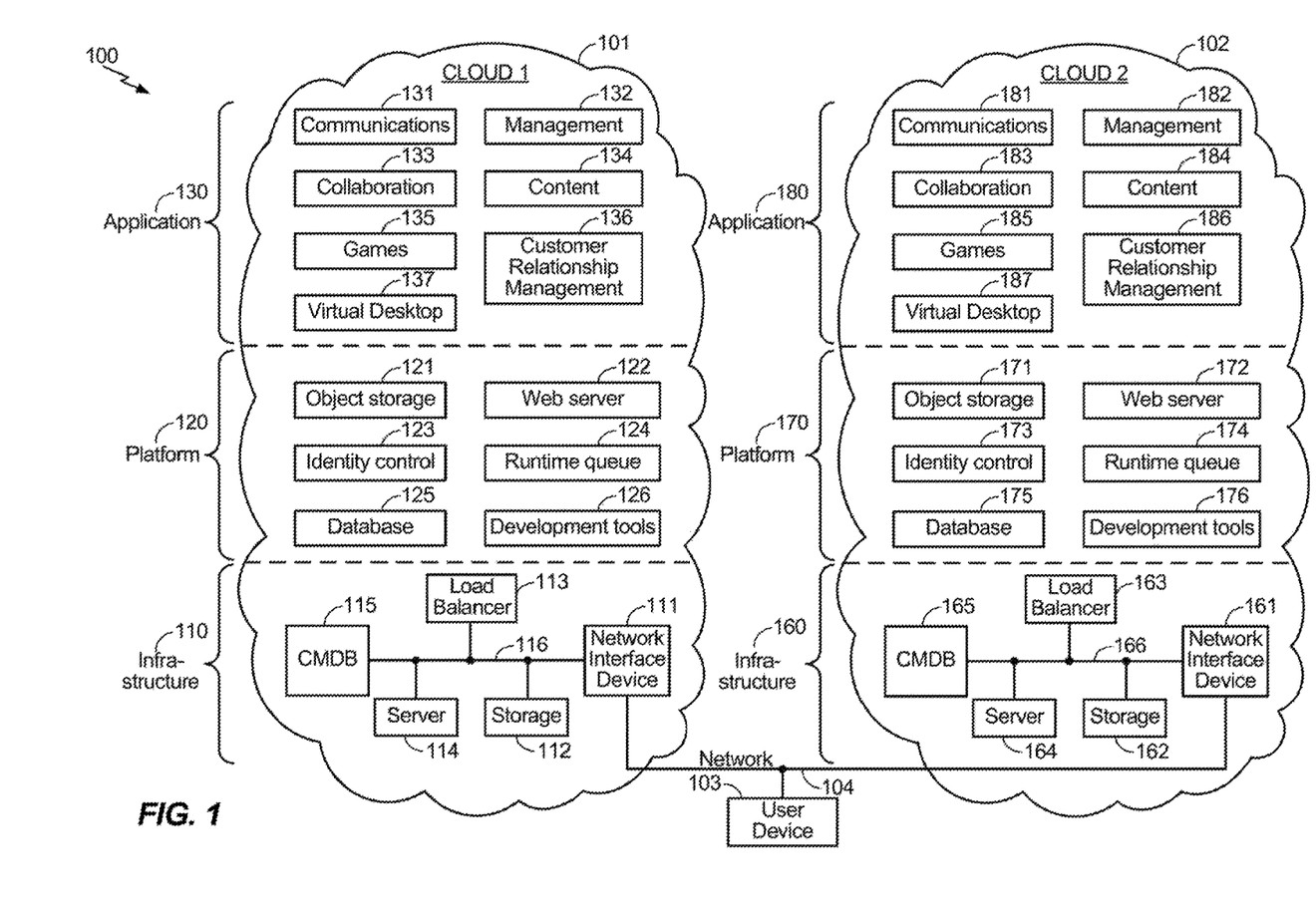
FIG. 1 depicts an example cloud computing arrangement.

FIG. 1 depicts an example cloud computing arrangement 100 including a first cloud 101 and a second cloud 102. For example, a first cloud provider can offer the first cloud 101, while a second cloud provider offers the second cloud 102.

A user device 103 is coupled to the first cloud 101 and the second cloud 102 via one or more networks 104. The user device 103 can be a computer (for example, a desktop computer, a laptop computer, a tablet computer, the like, or a combination thereof), a mobile phone, the like, or a combination thereof. The one or more networks 104 can be a private network, a local network, a wide-area network, the Internet, any suitable communication network, the like, or a combination thereof. The one or more networks 104 can be implemented on any suitable platform including a wired network, a wireless network, an optical network, the like, or a combination thereof.

The first cloud 101 can be divided into infrastructure 110, platform 120, and one or more applications 130. The infrastructure 110 includes tangible electronic hardware. The infrastructure 110 can include one or more network interface devices 111. The one or more network interface devices 111 can be coupled to the one or more networks 104. The infrastructure 110 can include one or more storage devices 112. The one or more storage devices 112 can include one or more disk storage devices, a quantity of memory (such as random-access memory (RAM), read-only memory (ROM), flash RAM, the like, or a combination thereof), one or more solid state drives (SSD), the like, or a combination thereof. The infrastructure 110 can include one or more load balancers 113, one or more servers 114, one or more Configuration Management Databases (CMDB) 115, the like, or a combination thereof. The CMDB 115 can control and manage distributed virtual computing in the first cloud 101. The CMDB 115 stores data describing policies to be enforced across constituent data centers in the first cloud 101. The CMDB 115 can also store configuration information for instantiating workloads using one or more specific environments which are configured to use the first cloud's 101 constituent computing components (for example, computing components in the infrastructure 110). Constituent components of the infrastructure 110 can be coupled to each other via a first cloud network 116.

The platform 120 and the applications 130 include software which is configured to implement, at least in part, at least a portion of the hardware in the infrastructure 110. In an example, at least one of the platform 120 or the applications 130 can be a set of computer instructions stored on a non-transitory computer-readable storage medium which, upon execution, configure one or more processors (for example, in the server 114) to create specific logic circuits (for example, one or more tangible electronic circuits configured to perform a logical operation), thus at least temporarily converting the one or more processors into a special-purpose processor.

The platform 120 can optionally include object storage 121, one or more web servers 122, identity control 123, one or more runtime queues 124, one or more databases 125, one or more development tools 126, the like, or a combination thereof.

The applications 130 can optionally include software configured to enable communications 131, management 132, collaboration 133, content 134, one or more games 135, customer relationship management 136, one or more virtual desktops 137, the like, or a combination thereof.

The second cloud 102 can be divided into infrastructure 160, platform 170, and one or more applications 180. The infrastructure 160 includes tangible electronic hardware. The infrastructure 160 can include one or more network interface devices 161. The one or more network interface devices 161 can be coupled to the one or more networks 104. The infrastructure 160 can include one or more storage devices 162. The one or more storage devices 162 can include one or more disk storage devices, a quantity of memory (such as RAM, ROM, flash RAM, the like, or a combination thereof), one or more SSD, the like, or a combination thereof. The infrastructure 160 can include one or more load balancers 163, one or more servers 164, one or more CMDB 165, the like, or a combination thereof. The CMDB 165 can control and manage distributed virtual computing in the second cloud 102. The CMDB 165 stores data describing policies to be enforced across constituent data centers in the second cloud 102. The CMDB 165 can also store configuration information for instantiating workloads using one or more specific environments which are configured to use the second cloud's 102 constituent computing components (for example, computing components in the infrastructure 160). Constituent components of the infrastructure 160 can be coupled to each other via a first cloud network 166.

The platform 170 and the applications 180 include software which is configured to implement, at least in part, at least a portion of the hardware in the infrastructure 160. In an example, at least one of the platform 170 or the applications 180 can be a set of computer instructions stored on a non-transitory computer-readable storage medium which, upon execution, configure one or more processors (for example, in the server 164) to create specific logic circuits (for example, one or more tangible electronic circuits configured to perform a logical operation), thus at least temporarily converting the one or more processors into a special-purpose processor.

The platform 170 can optionally include object storage 171, one or more web servers 172, identity control 173, one or more runtime queues 174, one or more databases 175, one or more development tools 176, the like, or a combination thereof.

The applications 180 can optionally include software configured to enable communications 181, management 182, collaboration 183, content 184, one or more games 185, customer relationship management 186, one or more virtual desktops 187, the like, or a combination thereof.

In an example, a user can implement computing resources in a cloud (for example, the first cloud 101, the second cloud 102) by creating and instantiating one or more workloads (for example, one or more virtual machines including an operating system and user-required specific software configured to run on a specific type of server). Cloud-enabled virtualization enables the user to interact with an abstraction which takes the place of a physical system. The user can access, configure, and manage the computing resources via a cloud's respective portal, an Application Programming Interface (API), the like, or a combination thereof.

Different cloud providers offer different clouds. For example, a first cloud provider can offer the first cloud 101, while a second cloud provider offers the second cloud 102. This is beneficial, as the cost for a single cloud provider to provide all conceivable computing resources is prohibitive. This also provides cloud users with more options than can be provided by a single cloud provider. Accordingly, to meet a certain need, a user may want to implement a collection of computing resources which includes computing resources in disparate clouds. For example, the user may need to implement a collection of computing resources including a first computing resource which is available in the first cloud 101 and not available in the second cloud 102. The user's collection of computing resources may also include a second computing resource which is available in the second cloud 102 and not available in the first cloud 101. The first and second computing resources likely will have different, and possibly incompatible, respective APIs. The provided apparatus and methods enable the user to manage implementing different computing resources which are different parts of different clouds.

Figure 2:
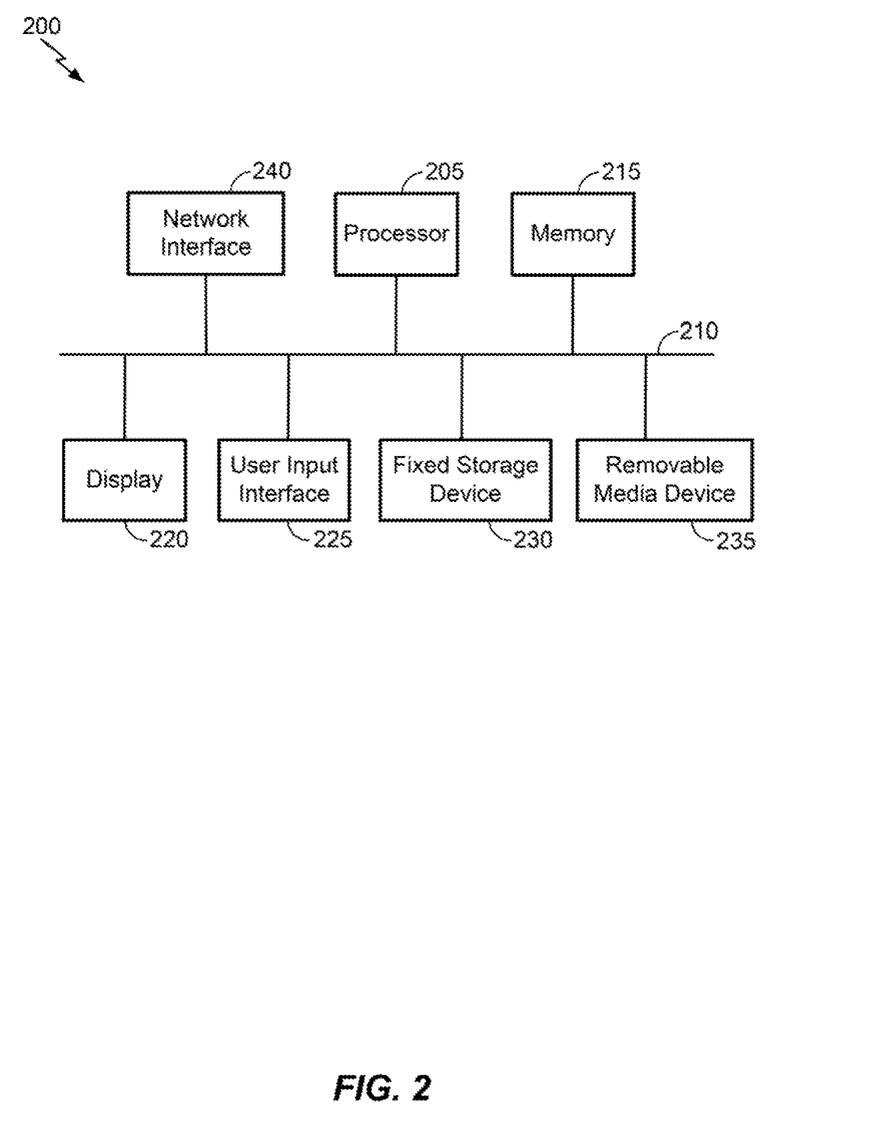
FIG. 2 depicts an example computing device suitable for implementing examples of the presently disclosed subject matter.

FIG. 2 illustrates an example computing device 200 suitable for implementing examples of the presently disclosed subject matter. In an example, the computing device 200 can be the user device 103. At least a portion of the methods, sequences, algorithms, steps, or blocks described in connection with the examples disclosed hereby can be embodied directly in hardware, in software executed by a processor (for example, a processor described hereby), or in a combination of the two. In an example, a processor includes multiple discrete hardware components. A software module can reside in a storage medium (for example, a memory device), such as a RAM, a flash memory, a ROM, an erasable programmable read-only memory (EPROM), an electrically erasable programmable read-only memory (EEPROM), a register, a hard disk, a removable disk, a compact disc read-only memory (CD-ROM), a storage medium, the like, or a combination thereof. An example storage medium (for example, a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (for example, an application specific integrated circuit (ASIC)), by program instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a method, a sequence, an algorithm, a step, or a block described hereby. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (that is, a non-transient) machine-readable media specifically excludes a transitory propagating signal. Additionally, a sequence of actions described hereby can be entirely within any form of non-transitory computer-readable storage medium having stored thereby a corresponding set of computer instructions which, upon execution, configure the processor to create specific logic circuits (for example, one or more tangible electronic circuits configured to perform a logical operation) in the processor. Configuring the processor to create specific logic circuits in the processor can at least temporarily transform the processor into a specific-purpose processor. Thus, examples may be in a number of different forms, all of which have been contemplated to be within the scope of the disclosure.

In an example, when a general-purpose computer (for example, a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method, a sequence, an algorithm, a step, or a block described in connection with an example disclosed hereby. Special programming can constitute any software which can cause a computer (for example, a general-purpose computer, a special-purpose computer, etc.) to be configured to perform one or more functions, features, steps algorithms, blocks, or a combination thereof, as disclosed hereby. A sufficient algorithm can constitute special programming. In an example, a combination of two or more related method steps disclosed hereby can form a sufficient algorithm.

The computing device 200 can be, for example, a desktop computer, a laptop computer, a mobile device, the like, or a combination thereof. The computing device 200 can include a processor 205, a bus 210, a memory 215 (such as RAM, ROM, flash RAM, the like, or a combination thereof), a video display 220 (such as a display screen), a user input interface 225 (which can include one or more controllers and associated user input devices such as a keyboard, mouse, touch screen, the like, or a combination thereof), a fixed storage device 230 (such as a hard drive, flash storage, the like, or a combination thereof), a removable media device 235 (operative to control and receive an optical disk, flash drive, the like, or a combination thereof), a network interface 240 operable to communicate with one or more remote devices via a suitable network connection, or a combination thereof. Examples of the disclosed subject matter can be implemented in, and used with, different component and network architectures.

The processor 205 is configured to control operation of the user device 200, including performing at least a part of a method described hereby. The processor 205 can perform logical and arithmetic operations based on processor-executable instructions stored within the memory 215. The processor 205 can execute instructions stored in the memory 215 to implement at least a part of a method described herein (for example, the processing illustrated in FIG. 3). The instructions, when executed by the processor 205, can transform the processor 205 into a special-purpose processor which causes the processor to perform at least a part of a function described hereby.

The processor 205 can comprise or be a component of a processing system implemented with one or more processors. The one or more processors can be implemented with a microprocessor, a microcontroller, a digital signal processor, a field programmable gate array (FPGA), a programmable logic device (PLD), an ASIC, a controller, a state machine, gated logic, a discrete hardware component, a dedicated hardware finite state machine, any other suitable entity which can at least one of manipulate information (for example, calculating, logical operations, and the like), control another device, the like, or a combination thereof. The processor 205 may also be referred to as a central processing unit (CPU), a special-purpose processor, or both.

The bus 210 interconnects components of the computing device 200. The bus 210 can enable information communication between the processor 205 and one or more components coupled to the processor 205. The bus system 210 can include a data bus, a power bus, a control signal bus, a status signal bus, the like, or a combination thereof. The components of the computing device 200 can be coupled together to communicate with each other using a different suitable mechanism.

The memory 215, can include at least one of ROM, RAM, a flash memory, an EPROM, an EEPROM, a register, other memory, the like, or a combination thereof stores information (for example, data, instructions, software, the like, or a combination thereof) and is configured to provide the information to the processor 205. The RAM can be a main memory configured to store an operating system, an application program, the like, or a combination thereof. The ROM (for example, a flash memory) can be configured to store a basic input-output system (BIOS) which can control basic hardware operation such as the processor's 205 interaction with peripheral components. The memory 215 can also include a non-transitory machine-readable media configured to store software. Software can mean any type of instructions, whether referred to as at least one of software, firmware, middleware, microcode, hardware description language, the like, or a combination thereof. Instructions can include code (for example, in source code format, in binary code format, executable code format, or in any other suitable code format). The memory 215 is an example of an electronic memory device.

The video display 220 can include a component configured to visually convey information to a user of the computing device 200.

The user input interface 225 can include a keypad, a microphone, a speaker, a display, the like, or a combination thereof. The user input interface 225 can include a component configured to convey information to a user of the computing device 200, receive information from the user of the computing device 200, or both.

The fixed storage device 230 can be integral with the computing device 200 or can be separate and accessed through other interfaces. The fixed storage device 230 can be an information storage device which is not configured to be removed during use, such as a hard disk drive.

The removable media device 235 can be integral with the computing device 200 or can be separate and accessed through other interfaces. The removable media device 235 can be an information storage device which is configured to be removed during use, such as a memory card, a jump drive, flash memory, the like, or a combination thereof. Code to implement the present disclosure can be stored in computer-readable storage media such as one or more of the memory 215, the fixed storage device 230, the removable media device 235, a remote storage location, the like, or a combination thereof.

The network interface 240 can electrically couple the computing device 200 to a network and enable exchange of information between the computing device 200 and the network. The network, in turn, can couple the computing device 200 to another electronic device, such as a remote server, a remote storage medium, the like, or a combination thereof. The network can enable exchange of information between the computing device 200 and the electronic device.

The network interface 240 can provide coupling (for example, to the network 104) via a wired connection, a wireless connection, or a combination thereof. The network interface 240 can provide such connection using any suitable technique and protocol as is readily understood by one of skill in the art. Example techniques and protocols include digital cellular telephone, WiFi™, Bluetooth®, near-field communications (NFC), the like, and combinations thereof. For example, the network interface 240 can enable the computing device 200 to communicate with other computers (for example, the first cloud 101 and the second cloud 102) via one or more local, wide-area, or other communication networks. Other devices or components (not shown in FIG. 2) can be coupled via the network interface 240.

All of the components illustrated in FIG. 2 need not be present to practice the present disclosure. Further, the components can be interconnected in different ways from that illustrated.

Example methods and apparatus customize cloud management software by injecting custom logic into the cloud management software. The custom logic can be injected by using one or more callouts, one or more hooks, the like, or a combination thereof, which are included in user-provided code. For example, the custom logic defines a trigger point, defines an action to be taken in response to the trigger being actuated, and can execute (e.g., call) the action in response to a trigger point being triggered. The custom logic can add actions to the UI of the cloud management software, such as requesting user-specified parameters at runtime via control integrated into the cloud management software's UI, and use the input user-specified parameters to execute an action to configure at least apportion of a workflow.

The custom logic can be injected, to make application-specific modifications, via a script which is run after a cloud-based server is brought online. The script can define one or more triggers at which to trigger initiating performing one or more respective actions, can define the one or more respective actions, and can initiate the one or more respective actions in response to the one or more triggers being actuated. The script can be received from a third-party code repository, can be deployed as part of a template which is dynamically-generated for the target cloud, can include post-deployment triggers which push or pull code to the cloud-based server, or a combination thereof.

An action (i.e., a user-defined operation) is a software function (e.g., unique programming) whose execution is initiated in response to a trigger being actuated. An action can be executable code in a form of a cloud management software plug-in, a remote script, a webhook, an email, an external orchestration flow, the like, or a combination thereof. An action can be executed at one or more points throughout a job flow. The unique programming can be executed, at least in part, at runtime, during provisioning, after provisioning, the like, or a combination thereof.

An action (i.e., a user-defined operation) can modify a job, an order, a server, a group, an environment, the like, or a combination thereof. An action can insert remote execution of scripts, a representational state transfer (REST) call, a custom script, the like, or a combination thereof. An action can require receiving an additional input from a user, can receive the additional input from the user, can be used to communicate a status report to the user, the like, or a combination thereof. In examples, an action can include connecting to another cloud system, calling an API, the like, or a combination thereof. An action can instruct the cloud management software to make a call (e.g., a call an API) to an external device (e.g., a cloud computing device, vCenter, Amazon Web Service, ServiceNow, Infoblox, etc). The specific API called can be determined by the cloud management software, the unique programming, the like, or a combination thereof.

Actuating a trigger initiates executing a respective action. In an example, a trigger point can be actuated during server ordering, server provisioning, the like, or a combination thereof.

Types of triggers can include: job trigger points, order trigger points, parameter trigger points, and user trigger points.

Job trigger points relate to jobs. For example, triggered actions can be executed, at different times, in an order by the respective job-type: pre-job, pre-<job-type>, the time when the job is run, post-<job-type>, and post-job. In an example, a "provision server" job has trigger points which occur during executing the job (not just pre- and post-job). In other words, the triggered actions need not occur all at once, and can be executed at different times during executing the respective job.

Order trigger points relate to orders. A first example of an order trigger point is "order approval." The order approval trigger point executes an associated action when an order for a service is submitted for approval. This trigger point can be used to integrate cloud management software with a third party cloud management system. A second example of an order trigger point is "pre-order execution," in which an associated action is triggered after an order is approved and before a job is created. The pre-order execution trigger can be used to alter job parameters before the associated job is executed. A third example of an order trigger point is "post-order completion," in which the associated action executes when a related order is marked as completed (either as a success or as a failure).

Regarding parameter trigger points, a first example of a parameter-related trigger point is a "parameter change" trigger point, which executes a respective action when a user changes a specific parameter of a cloud computing device (e.g., a server). This parameter change trigger point can be used to alter the cloud computing device, to contact another system when users change parameter values on the cloud computing device, the like, or a combination thereof. The second example of a parameter-related trigger point is a "generated parameter options" trigger point, which dynamically determines which options should be presented to a user for user input of a specific parameter.

Another type of trigger point is a "user" trigger point. For example, an "external users sync" trigger can execute an action each time a user (e.g., an external user, an active directory (AD) user, a lightweight directory access protocol (LDAP) user, the like, or a combination thereof) logs into the cloud management system. The corresponding action can update the users' permission(s) and group membership in the cloud management software, based on data in the AD.

In another example, if a trigger point invokes an action which requires one or more user inputs, default values for those one or more user inputs can be provided (e.g., displayed) to a user. In a further example, the same action can have different default values when the action is invoked from different trigger points.

Figure 3:
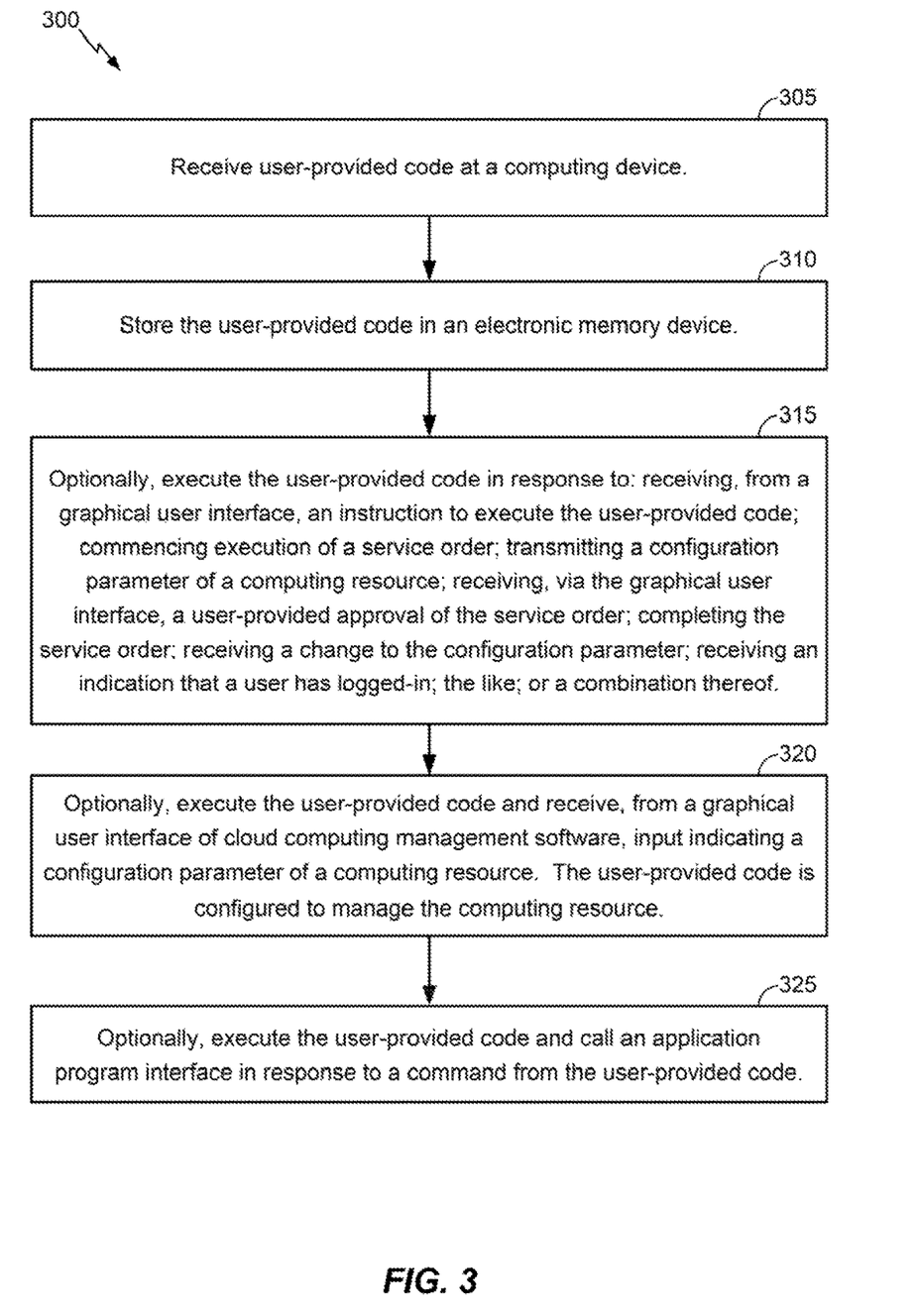
FIG. 3 depicts an example method for orchestrating cloud computing resources.

FIG. 3 depicts an example method 300 for orchestrating cloud computing resources, which can be performed at least in part by at least a portion of the apparatus described hereby, such as the user device 103, the computing device 200, the like, or a combination thereof. The method 300 can, among other advantages, advantageously reduce complexity of selecting, configuring, and managing computing resources across different cloud computing platforms. The method 300 can also beneficially reduce the time required to select, configure, and manage computing resources across different cloud computing platforms. A cloud computing platform management device which is configured to perform at least a portion of the method 300 has improved functions, relative to conventional techniques and devices.

In block 305, user-provided code is received at a computing device. The user-provided code is configured to add one or more computing resource management functions to cloud computing management software, without otherwise modifying the cloud computing management software. The user-provided code can be a plug-in, a script, a webhook, a callout, the like, or a combination thereof. At least a portion of the user-provided code can be subsequently executed.

In block 310, the user-provided code is stored in an electronic memory device. At least a portion of the user-provided code can be subsequently retrieved for execution.

In optional block 315, the user-provided code is executed in response to: receiving, from a graphical user interface, an instruction to execute the user-provided code; commencing execution of a service order; transmitting a configuration parameter of a computing resource; receiving, via the graphical user interface, a user-provided approval of the service order; completing the service order; receiving a change to the configuration parameter; receiving an indication that a user has logged-in; the like; or a combination thereof.

In optional block 320, the method 300 further includes executing the user-provided code and receiving, from a graphical user interface of the cloud computing management software, input indicating a configuration parameter of a computing resource. The user-provided code is configured to manage the computing resource.

In optional block 325, the method 300 further includes executing the user-provided code and calling an application program interface in response to a command from the user-provided code.

The foregoing blocks are not limiting of the examples. The blocks can be combined and/or the order can be rearranged, as practicable. In an example, block 310 is optional, if at least a portion of at least one of blocks 315, 320, or 325 is performed.

As used hereby, the term "example" means "serving as an example, instance, or illustration." Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements." For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, modules, circuits, and steps described in the examples disclosed hereby can be implemented as electronic hardware, computer software, or combinations of both, as practicable. To clearly illustrate this interchangeability of hardware and software, example components, blocks, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, for each of the examples described hereby, a corresponding electrical circuit of any such examples may be described hereby as, for example, "logic configured to" perform a described action.

At least one example provided hereby can include a non-transitory (that is, a non-transient) machine-readable media and/or a non-transitory (that is, a non-transient) computer-readable media storing processor-executable instructions (e.g., code, software, a software module, the like, or a combination thereof) configured to cause a processor (for example, a special-purpose processor) to transform the processor and any other cooperating devices into a machine (for example, a special-purpose processor) configured to perform at least a part of a function described hereby, at least a part of a method described hereby, the like, or a combination thereof. Performing at least a part of a function described hereby can include initiating at least a part of the function described hereby. Performing at least a part of a method described hereby can include initiating at least a part of the method described hereby. In an example, execution of the stored instructions can transform a processor and any other cooperating devices into at least a part of an apparatus described hereby. A non-transitory (that is, a non-transient) machine-readable media specifically excludes a transitory propagating signal. Further, one or more embodiments can include a computer-readable medium embodying at least a part of a function described hereby, at least a part of a method described hereby, the like, or a combination thereof.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. While this disclosure describes examples, changes and modifications can be made to the examples disclosed hereby without departing from the scope defined by the appended claims. The present disclosure is not intended to be limited to the specifically disclosed examples alone.

What is claimed is:

1. A method for performing a workload in a multiple cloud environment, the method comprising:
   receiving, by a computing device and from a user device, user-provided code, wherein the user-provided code is configured to add one or more computing resource management functions to cloud computing management software, without otherwise modifying the cloud computing management software;
   storing the user-provided code in an electronic memory device;
   executing, by the computing device, the cloud computing management software with the user-provided code, to cause the computing device to have a customized configuration to perform the workload in the multiple cloud environment, wherein the customized configuration at least defines a trigger point, defines an action to be taken in response to the trigger point being actuated, and causes the action to be executed in response to the trigger point being actuated;
   executing the user-provided code;
   receiving, from a graphical user interface of the cloud computing management software, input indicating a configuration parameter of a computing resource, wherein the user-provided code is configured to manage the computing resource; and
   providing, by the computing device to the user device, a result of the workload.

2. The method of claim 1, wherein the user-provided code is:
   a plug-in;
   a script;
   a webhook;
   a callout; or
   a combination thereof.

3. The method of claim 1, wherein the executing the user-provided code is in response to:
   receiving, from the graphical user interface, an instruction to execute the user-provided code;
   commencing execution of a service order;
   transmitting a configuration parameter of a computing resource;
   receiving, via the graphical user interface, a user-provided approval of the service order;
   completing the service order;
   receiving a change to the configuration parameter;
   receiving an indication that a user has logged-in; or
   a combination thereof.

4. The method of claim 1, further comprising calling an application program interface in response to a command from the user-provided code.

5. An apparatus for performing a workload in a multiple cloud environment, the apparatus comprising:
   a processor; and
   a memory coupled to the processor and configured to cause the processor to initiate creating specific logic circuits within the processor, wherein the specific logic circuits are configured to cause the processor to initiate:
      receiving, from a user device, user-provided code, wherein the user-provided code is configured to add one or more computing resource management functions to cloud computing management software, without otherwise modifying the cloud computing management software;
      storing the user-provided code in the memory;
      executing the cloud computing management software with the user-provided code, to cause the apparatus to have a customized configuration to perform the workload in the multiple cloud environment, wherein the customized configuration at least defines a trigger point, defines an action to be taken in response to the trigger point being actuated, and causes the action to be executed in response to the trigger point being actuated;
      executing the user-provided code;
      receiving, from a graphical user interface of the cloud computing management software, input indicating a configuration parameter of a computing resource, wherein the user-provided code is configured to manage the computing resource; and
      providing, to the user device, a result of the workload.

6. The apparatus of claim 5, wherein the user-provided code is:
   a plug-in;
   a script;
   a webhook;
   a callout; or
   a combination thereof.

7. The apparatus of claim 5, wherein the executing the user-provided code is in response to:
   receiving, from the graphical user interface, an instruction to execute the user-provided code;
   commencing execution of a service order;
   transmitting a configuration parameter of a computing resource;
   receiving, via the graphical user interface, a user-provided approval of the service order;
   completing the service order;
   receiving a change to the configuration parameter;
   receiving an indication that a user has logged-in; or
   a combination thereof.

8. The apparatus of claim 5, wherein the memory is configured to cause the processor to initiate creating specific logic circuits configured to cause the processor to and initiate calling an application program interface in response to a command from the user-provided code.

9. A non-transitory computer-readable medium, comprising processor-executable instructions stored thereon configured to cause a processor to initiate:
   receiving, by the processor, user-provided code, wherein the user-provided code is configured to add one or more computing resource management functions to cloud computing management software, without otherwise modifying the cloud computing management software;
   storing the user-provided code in an electronic memory device;
   executing, by the processor, the cloud computing management software with the user-provided code, to cause the processor to have a customized configuration to perform the workload in the multiple cloud environment, wherein the customized configuration at least defines a trigger point, defines an action to be taken in response to the trigger point being actuated, and causes the action to be executed in response to the trigger point being actuated;

executing the user-provided code;

receiving, from a graphical user interface of the cloud computing management software, input indicating a configuration parameter of a computing resource, wherein the user-provided code is configured to manage the computing resource; and providing, by the processor to the user device, a result of the workload.

10. The non-transitory computer-readable medium of claim 9, wherein the user-provided code is:

a plug-in;

a script;

a webhook;

a callout; or a combination thereof.

11. The non-transitory computer-readable medium of claim 9, wherein the processor-executable instructions to cause the processor to initiate executing the user-provided code are in response to:

receiving, from the graphical user interface, an instruction to execute the user-provided code;

commencing execution of a service order;

transmitting a configuration parameter of a computing resource;

receiving, via the graphical user interface, a user-provided approval of the service order;

completing the service order;

receiving a change to the configuration parameter;

receiving an indication that a user has logged-in; or a combination thereof.

12. The non-transitory computer-readable medium of claim 9, wherein the processor-executable instructions further include instructions to cause the processor to initiate calling an application program interface in response to a command from the user-provided code.

* * * * *